United States Patent [19]
Rico Ruiz et al.

[11] Patent Number: 5,722,318
[45] Date of Patent: Mar. 3, 1998

[54] OLIVE STONING MACHINES

[75] Inventors: Vicente Rico Ruiz; Antonio Garrido Perez, both of Dos Hermanas, Spain

[73] Assignee: Sociedad Anonimya De Racionalizacion Y Mecanizacion (Sadrym), Dos Hermanas, Spain

[21] Appl. No.: 568,461

[22] Filed: Dec. 7, 1995

[30] Foreign Application Priority Data

Nov. 17, 1995 [ES] Spain ........................ 9502253

[51] Int. Cl.$^6$ ........................ A23N 4/08; A23N 4/22
[52] U.S. Cl. ........................ 99/494; 99/548; 99/549; 99/555; 99/561; 99/565
[58] Field of Search .......................... 99/494, 542, 544, 99/546, 548, 549, 552–555, 565, 559–561; 426/484, 485, 282

[56] References Cited

U.S. PATENT DOCUMENTS

| | | |
|---|---|---|
| 4,220,080 | 9/1980 | Magaroli et al. ........................ 99/494 |
| 4,265,169 | 5/1981 | Silvestrini ........................ 99/555 X |
| 4,644,859 | 2/1987 | Gitoerrez Rubio et al. ......... 99/561 X |
| 4,727,802 | 3/1988 | Del Ser Gonzalez ................ 99/548 X |

*Primary Examiner*—Timothy F. Simone
*Attorney, Agent, or Firm*—Ladas & Parry

[57] ABSTRACT

Such are designed to optionally allow the stoning machine to work as an olive stoner-slicer and lie in establishing at quite some distance from a disc (14') bearing cups (14) serving as dollies during the olive stoning stage, a disc (17') bearing a plurality of cradles (17) toward which the stoned olives (31) are conveyed when the stoning punch (13) retracts, which punch is to this end provided with olive retaining spears (13') and it is thus at these cradles (17), i.e. outside the stoning area, where the olive is cut into slices with the assistance of a set of parallel, disc-shaped and turning blades (23) or fixed blades with an arcuate and concave cutting-edge (38), each such blades (23–38) being capable of taking up two near- and far-end positions with respect to the cradles (17) in order for the stoning machine to act also as a slicer or only as a slicer.

7 Claims, 13 Drawing Sheets

OLIVE STONING MACHINES

OBJECT OF THE INVENTION

The present invention relates to a number of improvements to olive stoning machines with which a machine of this kind is capable of working not only as a conventional stoner, removing the stone from an olive, but as a slicer which obviously allows the fruit to be cut into slices right after being stoned, whenever this additional operation is required.

BACKGROUND OF THE INVENTION

Various different olive stoning solutions are known, noteworthy among these being the machine described and claimed in U.S. Pat. No. 537,820 issued to the applicant hereof.

The structure of the machine is based upon a horizontal axis on which a pair of coaxial rotatory drums are adjusted duly synchronised with a chain feeding the olives one by one and leading at a tangent onto the area where such drums are connected, said drums having punches and nozzles, certain punches being particularly capable of acting axially upon olives previously seated upon respective cups established on a rotatory disc, the opposite sides of which cups are reached by nozzles that make circular incisions on the olives, of suitable size to allow the stone to be removed, and thus said punches first perforate the pulp of the olive and tear the stone with the tip marked on the opposite end, such tip being housed in the respective cutting nozzle, a fixed blade then carrying out a shearing action in order for the tip and the stone to be separated, while a pushing punch playing within the nozzle then causes the tip to be definitively eliminated, thereby for stoned olives on the one hand and stones on the other, and furthermore the tips generated to allow stoning as such, to be obtained.

The required axial movements of punches and nozzles take place with the assistance of fixed cams provided with suitably directed perimetric channels in order for sheaves associated to such mobile elements to cause the same to be propelled and retracted at the appropriate times.

Stoning machines are also known to be constructed much like or identically to the above summary description and to be capable, once the olive has been stoned, to stuff the same with anchovies, peppers or other products.

The market however demands another variant in the marketing of olives, namely sliced olives, to be used as a cooking seasoning for instance in preparing pizzas and other products.

In this sense machines are also known that are fed with pre-stoned olives, and which cut or slice such olives to meet the requirements set out above.

And yet since two fully independent machines, stoner and slicer, are required, this solution needs substantial investment costs which also apply to maintenance, and the overall process is at the same time also more expensive, since transfer means are required from the stoning to the slicing machines.

A machine is also known which attempts to overcome this problem, as described in U.S. Pat. No. 4,876,954, and provides an olive-slicing mechanism on a basic stoning drum of the kind aforesaid. This slicing mechanism however causes the olives to be sliced in the same cell or receptacle where stoning takes place, which poses a problem of capital importance for in the event of stoning failure, because the size of the olive is unusual or it is incorrectly positioned, which happens frequently, the stone is also cut and it is therefore frequent to find a stone or stone splinters in the product to be packaged, which means that prior to packaging, said product, that is the sliced olives, needs must undergo a costly manual inspection procedure which not only considerably raises costs but further lessens the problem without actually fully solving it. The cutting-edge of the blade is also worn.

DESCRIPTION OF THE INVENTION

The improvements subject of the invention have been devised to fully solve both aspects of the problem aforesaid.

More specifically, with said improvements a stoning machine, with slight structural modifications that have little effect on the cost of making and maintaining the same, is capable of working simply as such a stoning machine, yielding stoned olives, or as a stoner-slicer, the end result being sliced olives.

Furthermore, and given its functional conception, the machine ensures that no stone may enter the cutting area and thus the absence of stone splinters or fragments in the mass of olive slices is also ensured without the conventional inspection or revision being necessary.

To achieve this and taking a base construction identical or similar to that described in U.S. Pat. No. 537,820, the subject improvements lie in providing the machine with an additional disc turning with the machine's drums and bearing on its periphery a plurality of cradles crossed by the stoning punchers and hence numerically and positionally coinciding therewith, in order that once the olive has been stoned, said stoning punches, fitted with suitable spears, redeem the olives and lay them on the respective slicing cradles.

This entire operation takes place without the drum's turning motion being stopped, that is working non-stop, and at a point on the periphery of the drum reached by stoned olives suitably lying on their respective slicing cradles, at which location there is a slicing mechanism with secant blades with respect to the periphery of the drum that act within the cradles aforesaid to cut or slice the stoned olives.

The cutting mechanism can actually comprise a set of circular, coaxial and consequently parallel blades, such blades being duly driven, or the cutting mechanism may comprise a set of fixed blades, with arcuate and concave shaped cutting-edges whose curvature is substantially off-centred with respect to the drum axis, in order to gradually penetrate into the slicing cradles as said drum turns normally.

Right after the set of slicing blades there is an ejecting comb acting in the spaces defined between the discs or blades, causing the olive slices generated by a multiple cutting thereof to be expelled.

In accordance with another characteristic of the invention, this cutting mechanism, i.e. the set of blades aforesaid, is mounted upon a support capable of taking up two near- or far-end positions with respect to the machine drum in order, as the user shall see fit, for such cutting device to be active or inactive, depending upon whether the machine is to be used exclusively as a stoner or else as a stoner-slicer.

DESCRIPTION OF THE DRAWINGS

In order to provide a fuller description and contribute to the complete understanding of the characteristics of this invention, a set of drawings is attached to the specification which, while purely illustrative and not fully comprehensive, shows the following.

PREFERRED EMBODIMENT OF THE INVENTION

With reference to the figures, an olive stoning machine fitted with the improvements subject of the invention, as any conventional machine of this kind, comprises a main drum having a turning axis (1) upon which are fixedly mounted an ejector cam (2), a nozzle cam (3) and a punch cam (4) whereas mounted to rotate are a drum (5) for the nozzles and ejectors and its respective pulley (5'), and a pulley or drum (6) for the punches, the stems of the nozzles (7) and the stems of the punches (8) playing axially on the periphery of these drums, and the ejectors (10) respectively play within said nozzle stems (7), these mobile elements all ending in sheaves (9) playing in the respective perimetric grooves of cams (2), (3) and (4).

More specifically, the nozzles as such numbered (11) which are suitably guided by bushings (12) are mounted upon a plate (12') whereas the punches as such numbered (13) lie at the end of stems (8) linking the same to the respective axially driven sheaves (9).

Another plate or disc (14') is established between nozzles (11) and punches (13) to support a plurality of cups (14) serving as olive dollies at the stoning stage, the olives entering the machine at a tangent resting upon a track (15) driven by a chain (16) having lateral pushers (16') for the olives.

Figure 1:
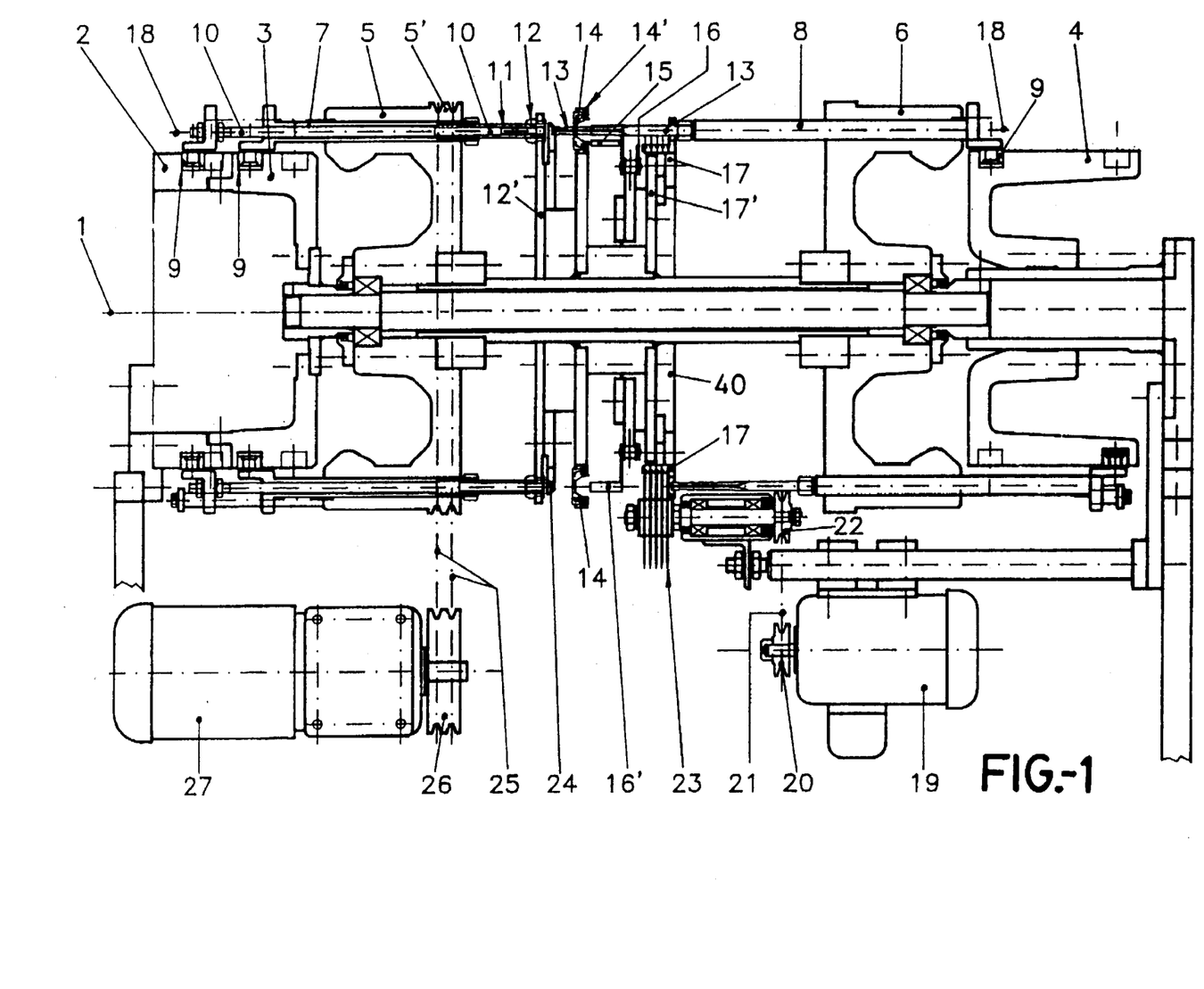
FIG. 1 Shows a schematic diametric sectional view of the main drum of an olive stoning machine made in accordance with the improvements subject of the present invention, and in accordance with a first embodiment where the cutting device has a plurality of circular and mobile blades.
Figure 2:
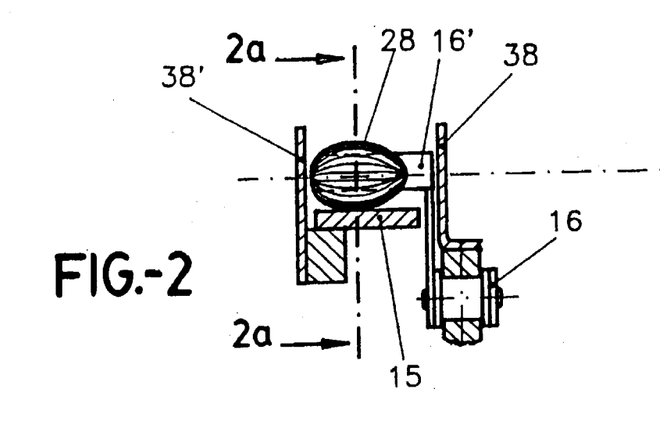
FIG. 2 Shows a cross-sectional close-view of the chain conveying the olives from the feeder to the stoning drum.
Figure 2A:
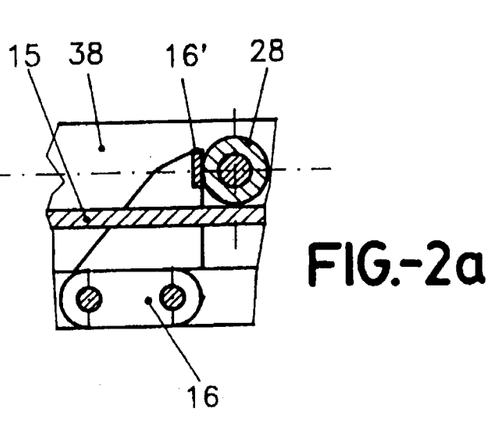
FIG. 2a. In turn shows a section of the previous figure along line 2a—2a in FIG. 2.
Figure 3:
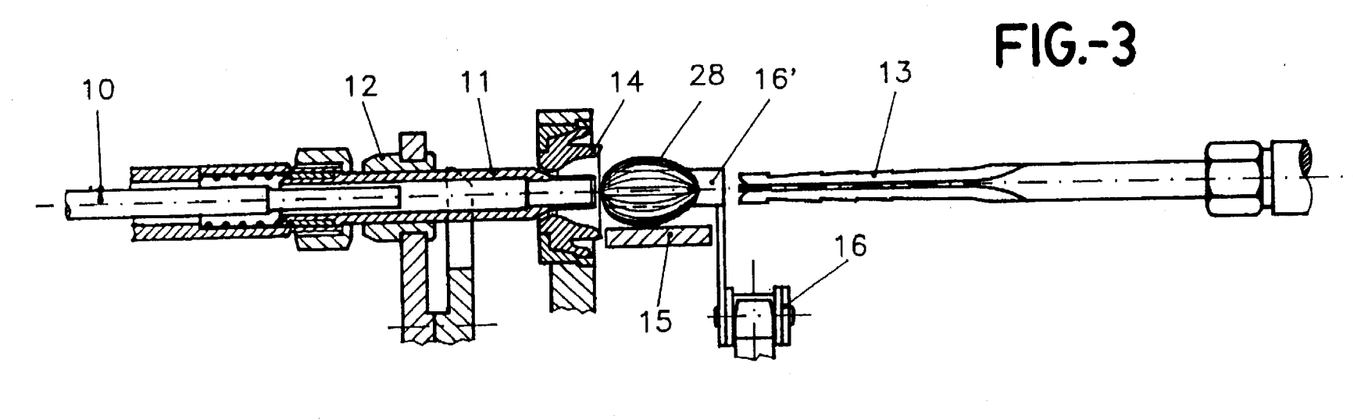
FIG. 3 Shows an enlarged and likewise sectional close-view of one of the multiple working axis established in the main drum and where each olive is stoned, the constituent elements of said working axis being visible in the position receiving the olive.
Figure 4:
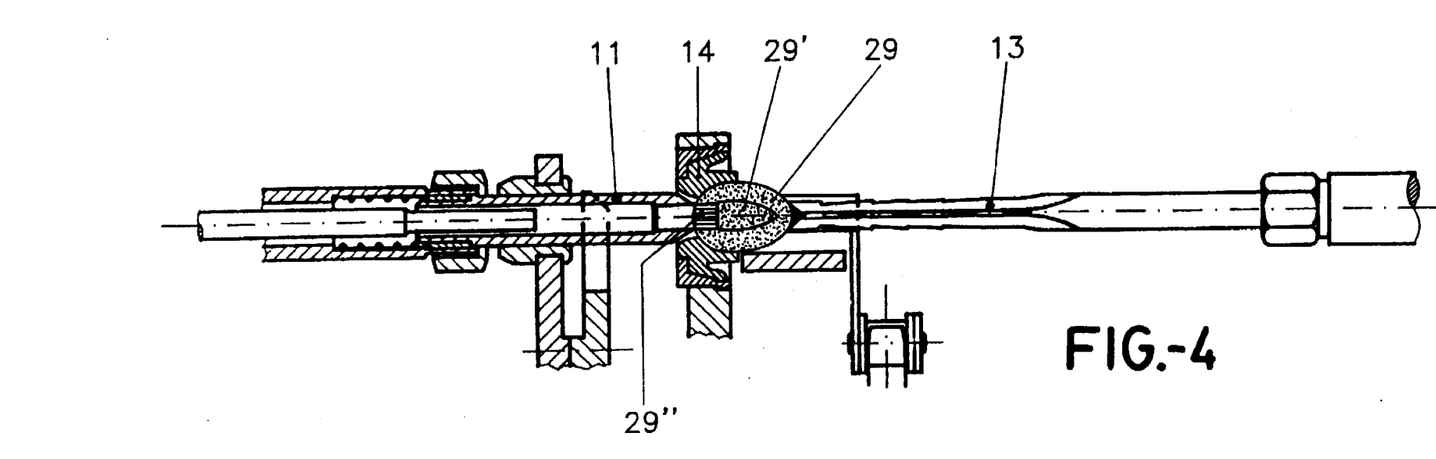
FIGS. 4, 5, 6 and 7 Show the same assembly of FIG. 3 in different and successive olive stoning operative stages.
Figure 5:
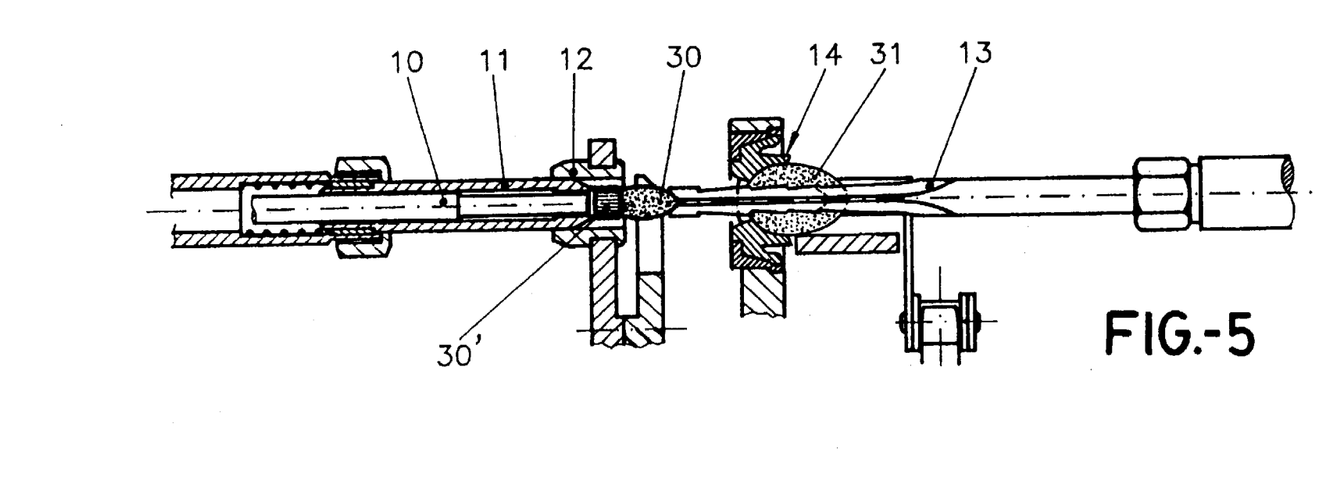

With this structure and on each stoning axis (18) after an unstoned olive (28) is coupled, the nozzle (11) is situated at the bottom of the cup (14) serving as a support for said olive which, as shown in FIG. 4, is acted upon on its opposite end by a punch (13) thereby for said punch to pierce through the olive pulp (29) and push the stone (29') axially whereas at its opposite area the nozzle (11) cuts a tip (29") whereupon the nozzle (11) moves back immediately at the same time as the punch (13) moves forward thereby, as shown in FIG. 5, for the assembly (30) comprising the stone and the tip to leave the olive while the stoned olive (31) is substantially inserted in the punch (13) which, on moving back, drags it along.

Figures 6, 7, 7A, 7B:
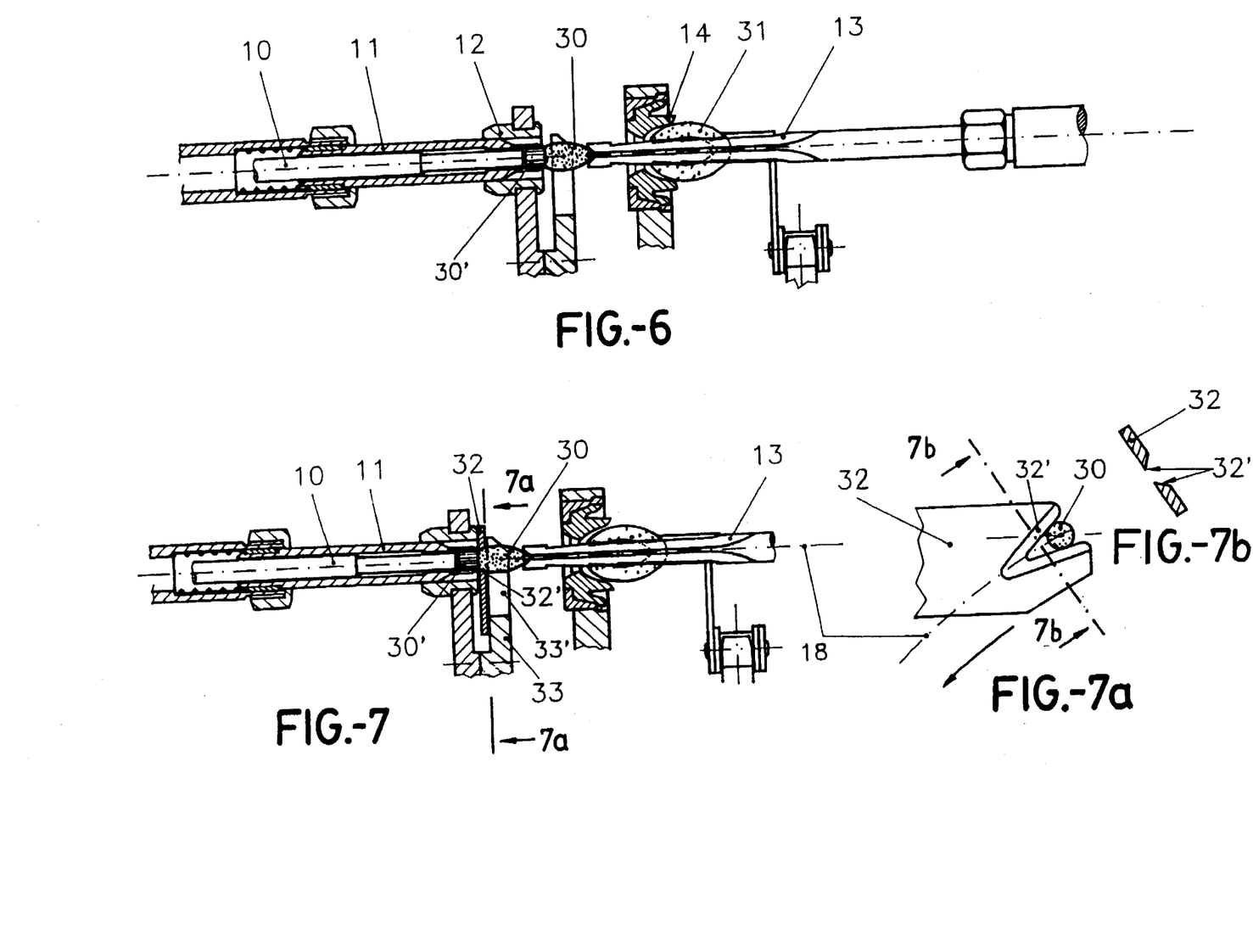
FIG. 7a–7b Shows a partial elevational close-view of the assembly shown in FIG. 7, at the level of the olive stone separator on line 7a—7a in FIG. 7, and cross-sectional closeview along line 7b—7b of FIG. 7a of such figure, showing the figure of the tip-removing blade.
Figure 8:
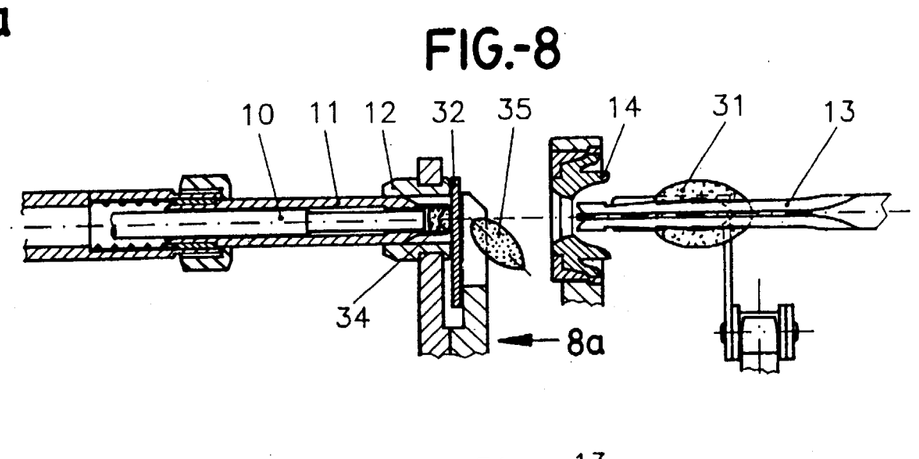
FIG. 8 Shows the same assembly as FIGS. 3 to 7 in a new stone separating operative stage.
Figure 8A:
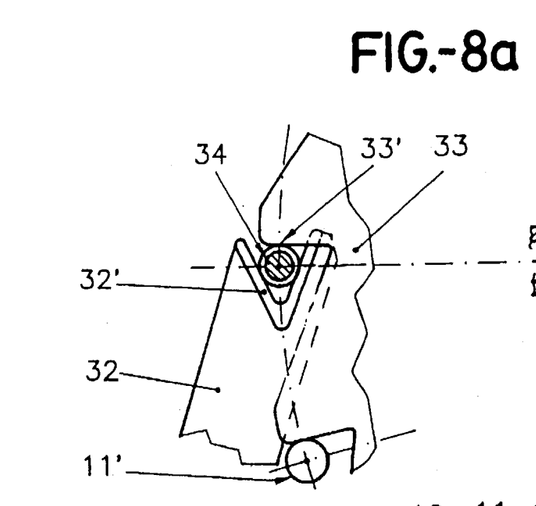
FIG. 8a Shows an axial view through "X" of the assembly of the previous figure.
Figures 9, 9A:
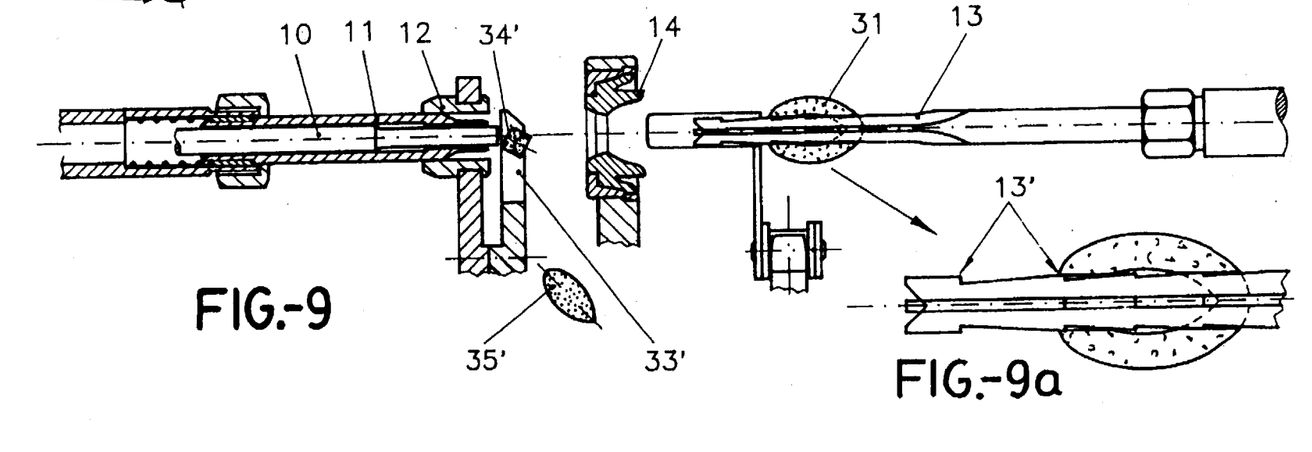
FIG. 9 Again shows the assembly of FIG. 8 after the stone has been eliminated and at the tip ejection stage.
FIG. 9a shows an enlarged scale of the stoning punch as it redeems the olive for the olive to be carried to the cutting area.
Figures 10, 11, 11A:
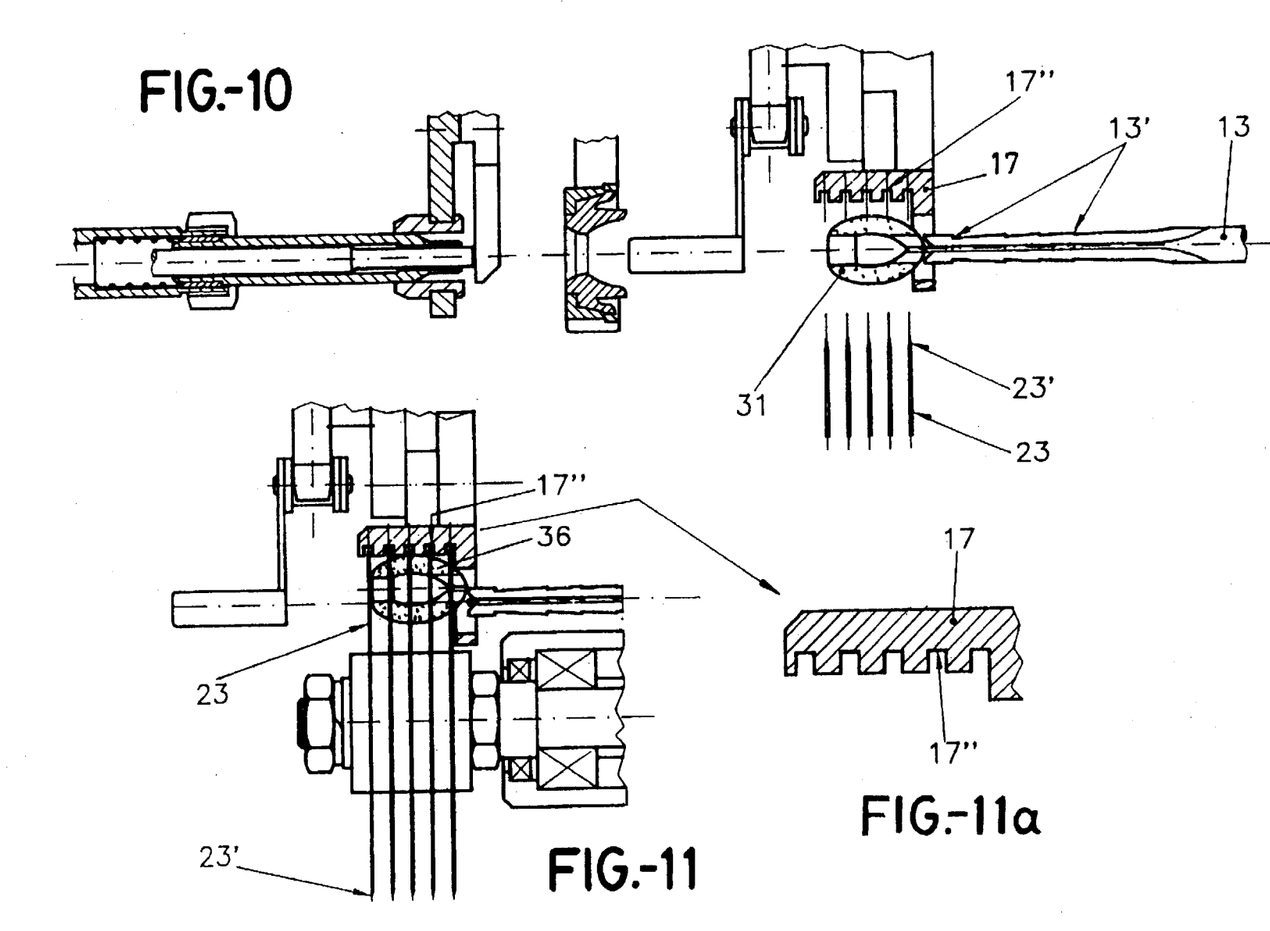
FIG. 10 Shows the same assembly of FIGS. 7 to 9, at a stage or time when the stoning punch lays the stoned olive on the cutting cradle.
FIG. 11 Shows a close-view of the previous figure at the level of said cutting cradle where the olive receives the action of a cutting mechanism. On an enlarged scale
FIG. 11a shows a close-view of the cutting-edges of the blades within the slots of the cradle to ensure that the slices are cut.

A static separator (32) acts between the stone and the pulp (30) whereas the pulp is retained within the nozzle guide (12) and the stone is respectively held back by a disc (24) provided on its periphery with a stelliform crown (33), the static separator (32) having a V-shaped profile (32') at its working area, shown in particular in FIGS. 7a and 8a, and thus when the drum on turning meets with this static separator, the tip (34) and the stone (35) are physically separated, which tip is numbered (34') when it is definitely separated from the machine on being axially propelled by the ejector (10) playing with the nozzle (11).

With this basic construction and in accordance with the essence of the invention, the punches (13) are provided with spears (13') that are useful when the punch (13) moves back for said punch to drag the stoned olive (31) with it, removing it from the seat defined by the cup (14), and in particular carrying it toward a slicing cradle (17), clearly visible in FIGS. 10 to 13, the various slicing cradles (17) being mounted upon a cradle-bearing disc (17') which also turns in synchrony with the remaining elements of the main drum of the machine.

The slicing cradles (17) work with a cutting mechanism that in a first embodiment comprises a motor (19) whose output shaft has a multiple cutting blade (23) locked thereto, which blades or discs have a bevelled cutting edge (23'), the blades (23) penetrating the cradles (17) to reach the grooves or channels (17") lying in such cradles, thereby to ensure that the olive is cut fully into slices with a width matching the spacing between blades (23).

Figure 12:
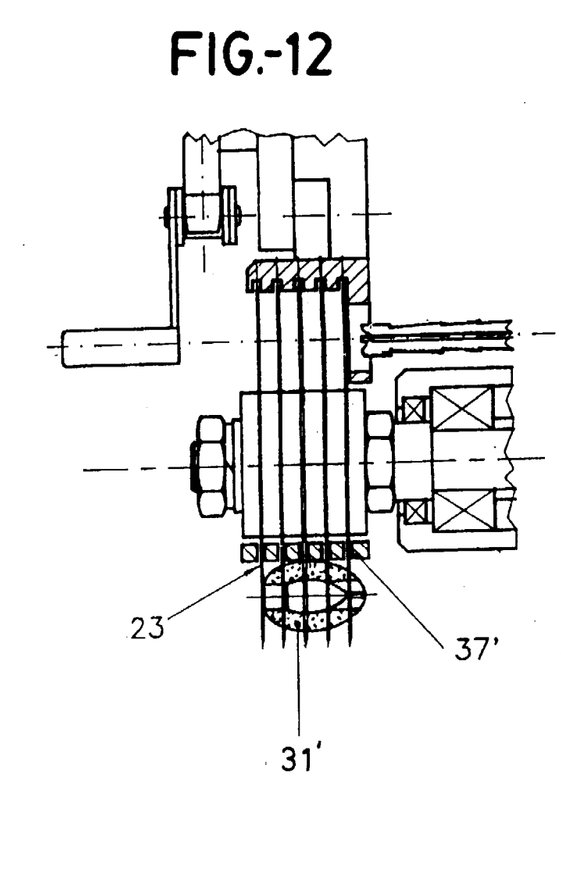
FIG. 12 Shows the same close-view of the previous figure at an intermediate stage when the olive slices are expelled by the ejecting comb.
Figure 13:
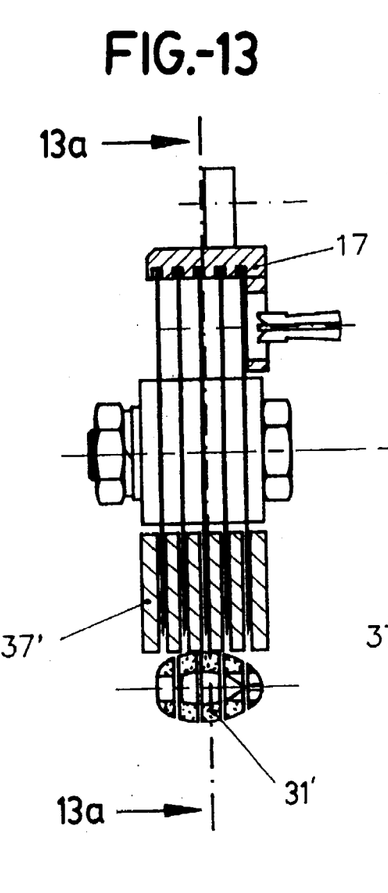
FIG. 13–13a Shows a close-view of the previous figure at a final stage in expelling the sliced olive detached by the expelling comb.
Figure 13A:
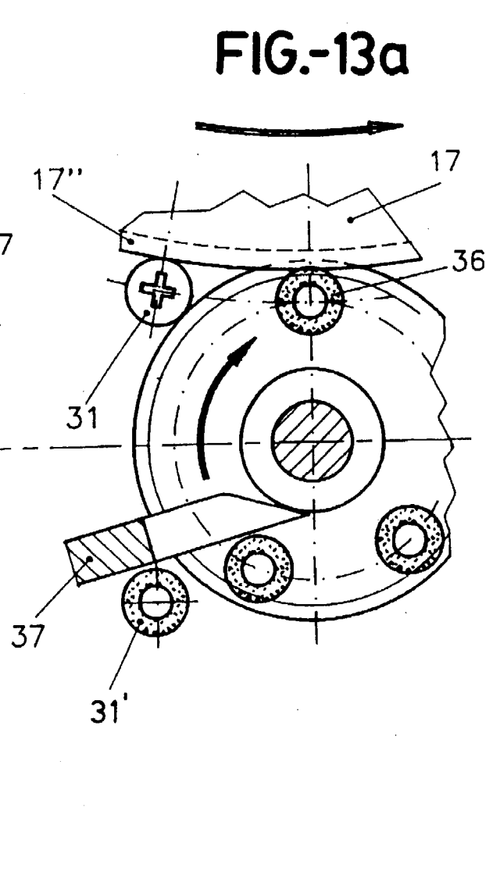
Figure 14:
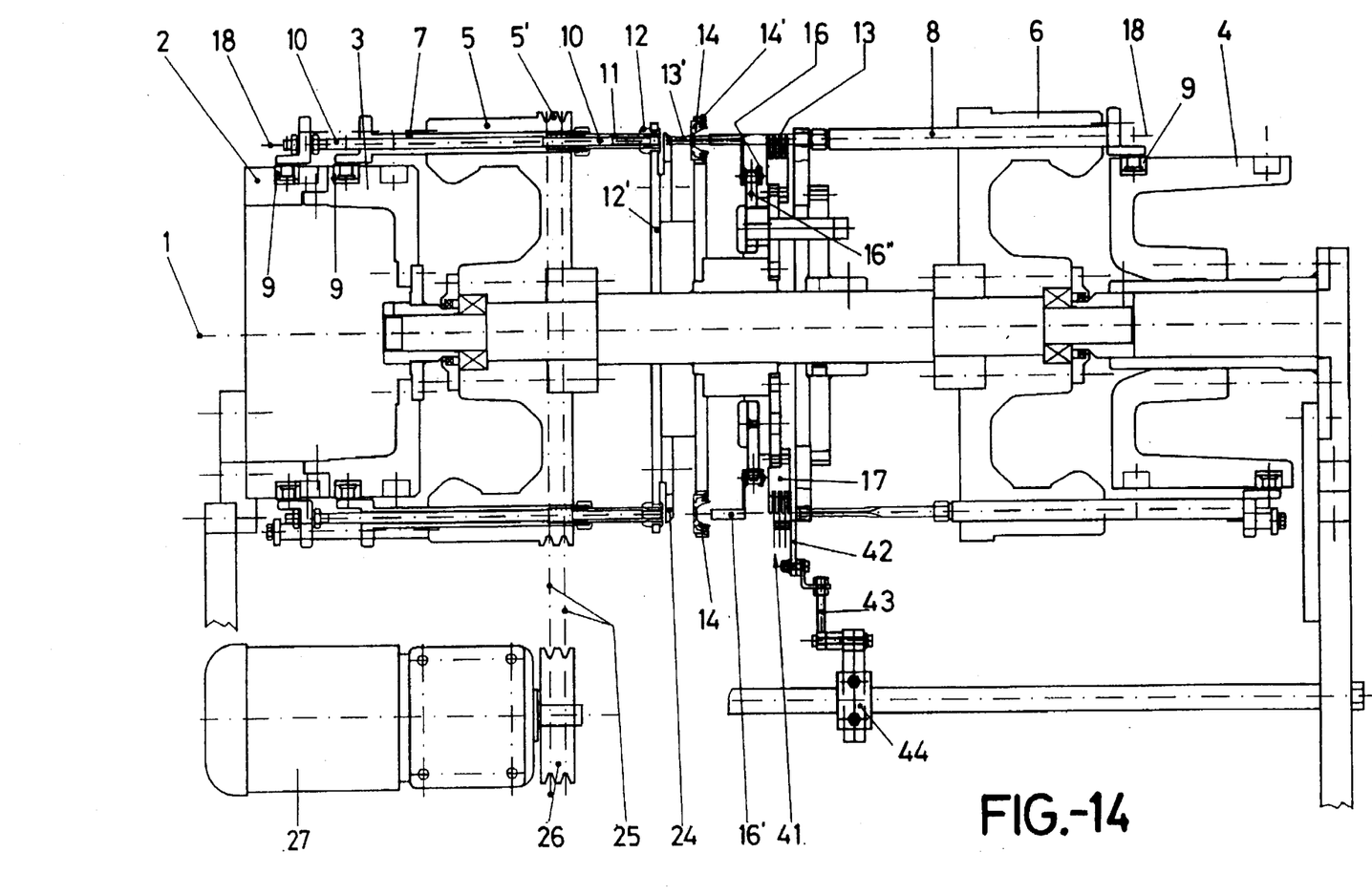
FIG. 14 Shows a view similar to that of FIG. 1 but with the cutting mechanism comprising circular and turning blades now replaced by a cutting mechanism having fixed blades.
Figures 15, 16:
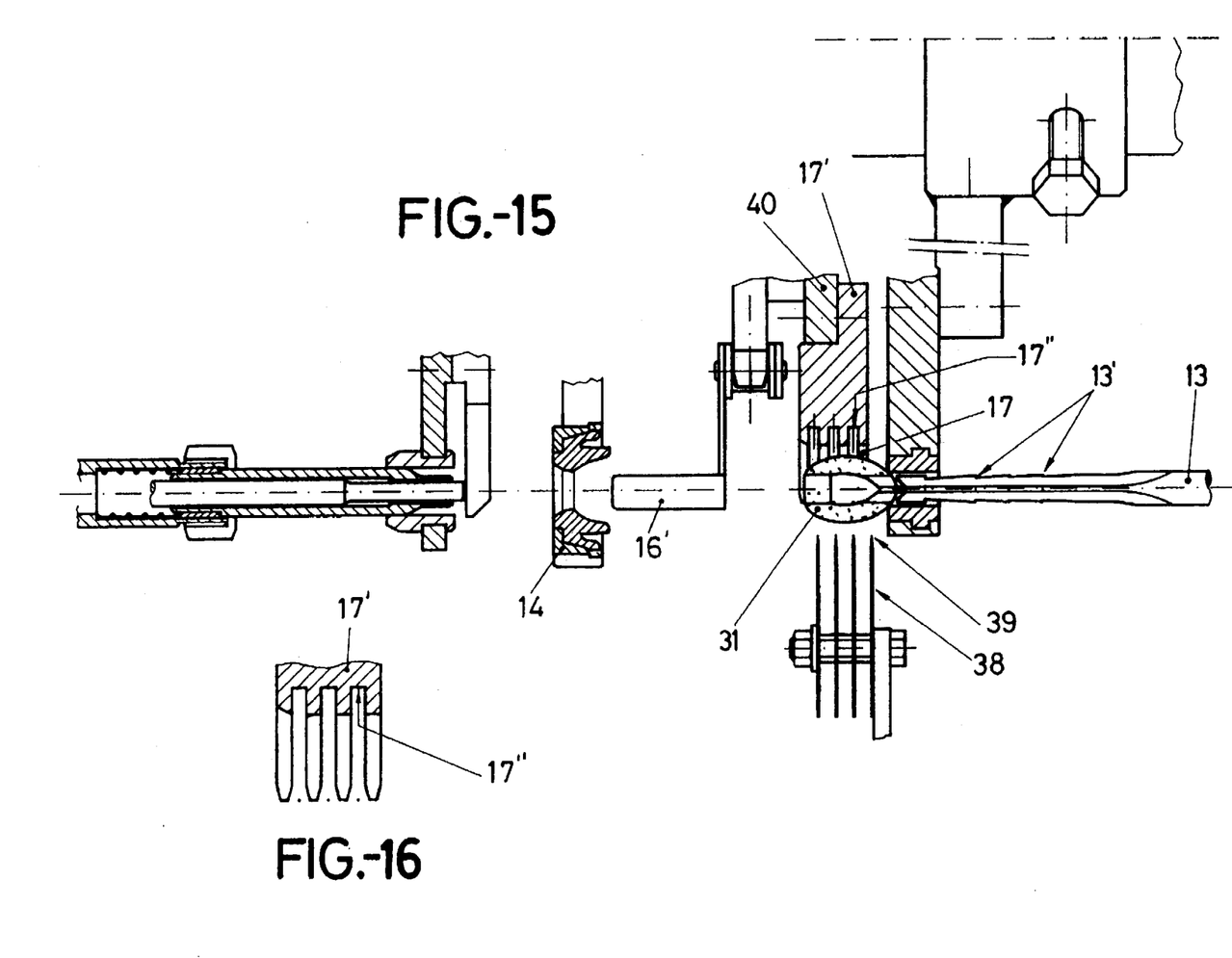
FIG. 15 Shows a close-view similar to that of FIG. 10, but relating to this cutting mechanism with fixed blades.
FIG. 16 Shows an enlarged close-view of one of the cutting cells of the respective drum.

In order for the slices (36) to be evacuated, said cutting mechanism and in particular the blades (23) work with an ejecting comb (37) whose teeth (37') pass between the cutting blades or discs (23) as shown in FIGS. 12 and 13, forcing the ejection and separation of the olive slices (36').

Figures 17, 18:
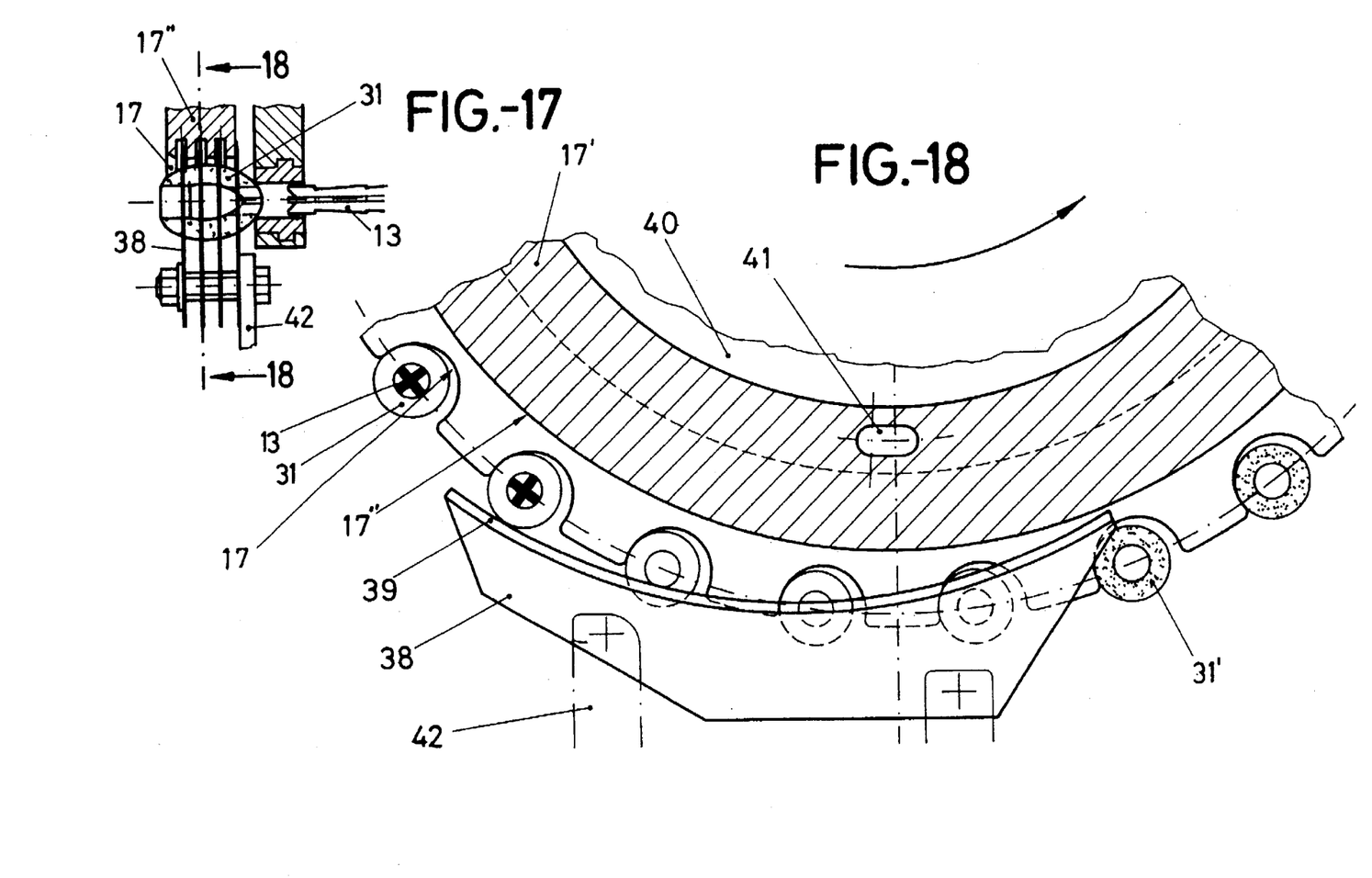
FIG. 17 Shows a close-view similar to that of FIG. 11 also for this cutting mechanism having fixed blades.
FIG. 18 Shows a cross-sectional close-view of the assembly shown in the previous figure, along line 18—18 of FIG. 17.
Figures 19, 20:
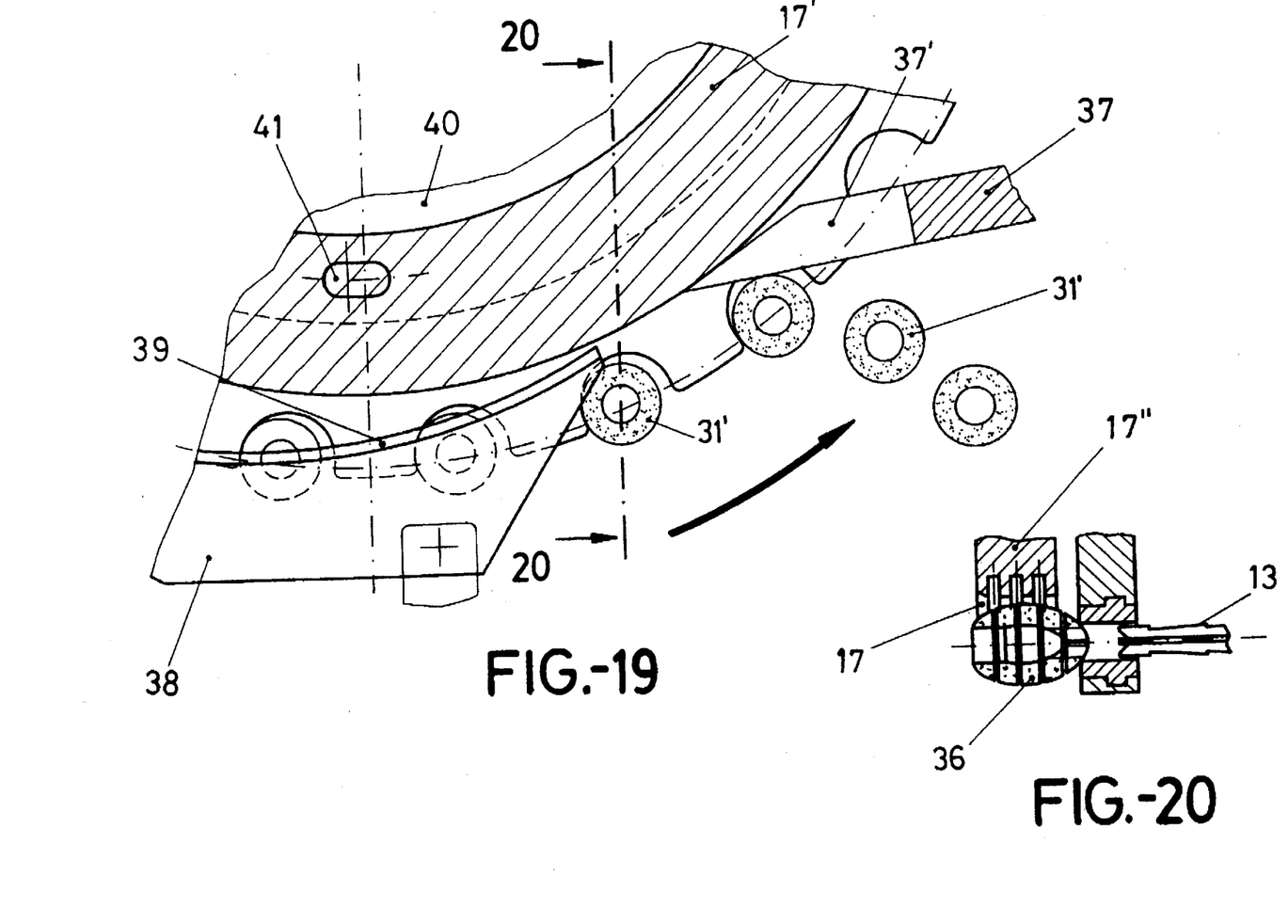
FIG. 19 Shows a view similar to that of the previous figure wherein the close-view is displaced laterally in the general context of the drum to show the ejection mechanism.
FIG. 20 Shows a cross-section of the assembly shown in the previous figure, along line 20—20 of FIG. 19.

Instead of the cutting mechanism aforesaid, the stoning machine may be fitted with a cutting device as shown in FIGS. 14 to 22, where the blades (38) are fixed and parallel, their cutting-edges (39) being arcuate and concave shaped, as shown especially in figure 18, their curvature being slightly eccentric with respect to the curvature of the machine drum thereby, as also shown in this figure, and in accordance with the turning movement of the drum (1), for said cutting-edge (39) to lie at one end at some distance from the beds or cradles (17) to allow free access of the olives to said cradles, reaching the bottom of the slots (17") to expedite cutting by means of a progressive incidence during relative displacement of the olive (31) and the set of blades (41) thereby for perfectly cut olive slices (31') to be obtained.

Going back to the beds (17) where the olives (31) are seated, and with both fixed and turning blades, it must be noted that the cradle-bearing disc (17') aforesaid is actually a circular crown mounted coaxially upon a supporting disc (40), the crown (17') having wide openings (41) for the passage of screws fixing both elements (17') and (40) thereby for the crown (17') to have some angular movement which in turn allows a positional adjustment of the beds or cells (17) in order to suit such position to whichever is best in view of the average size of the olives.

As is the case of the turning blades, the ejecting comb (37) expediting detachment of the sliced olives from the disc with cells (17'-40) is established at the outlet of the cutting mechanism.

Figure 21:
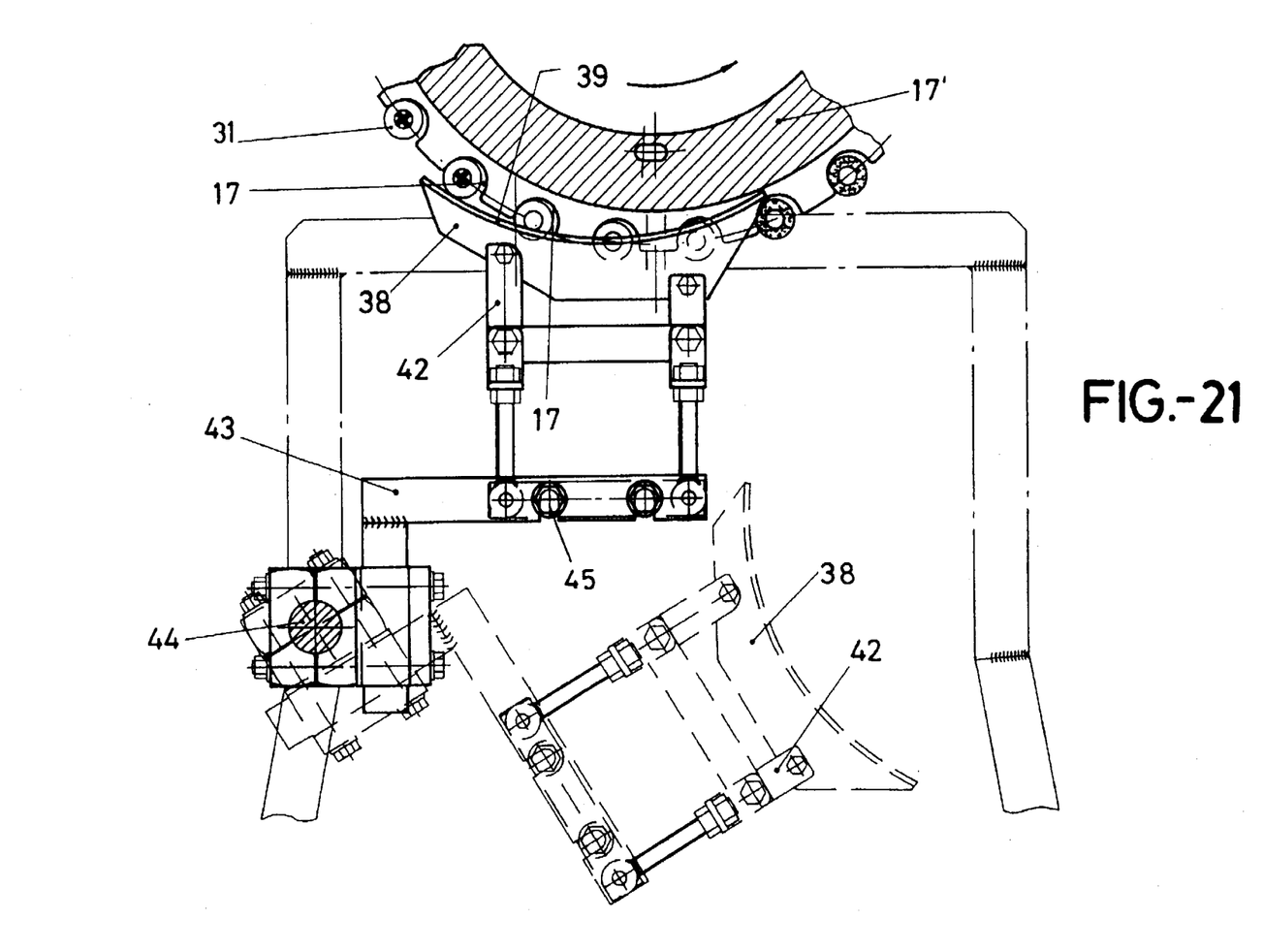
FIG. 21 Shows a side elevation view of the cutting mechanism as a whole, in particular of the fixed-blade mechanism showing the inactive position of said cutting mechanism with a broken line.

The set of blades (38) is mounted upon a support (42) which can be swivel-mounted through an arm (43) with the assistance of a swivel-axis (44) as shown in figure 21, thereby to be able to switch from the active position shown by the solid line of such figure to the inactive position shown by the broken line, in which the machine works as a simple stoner, without slicing the olives.

Figure 22:
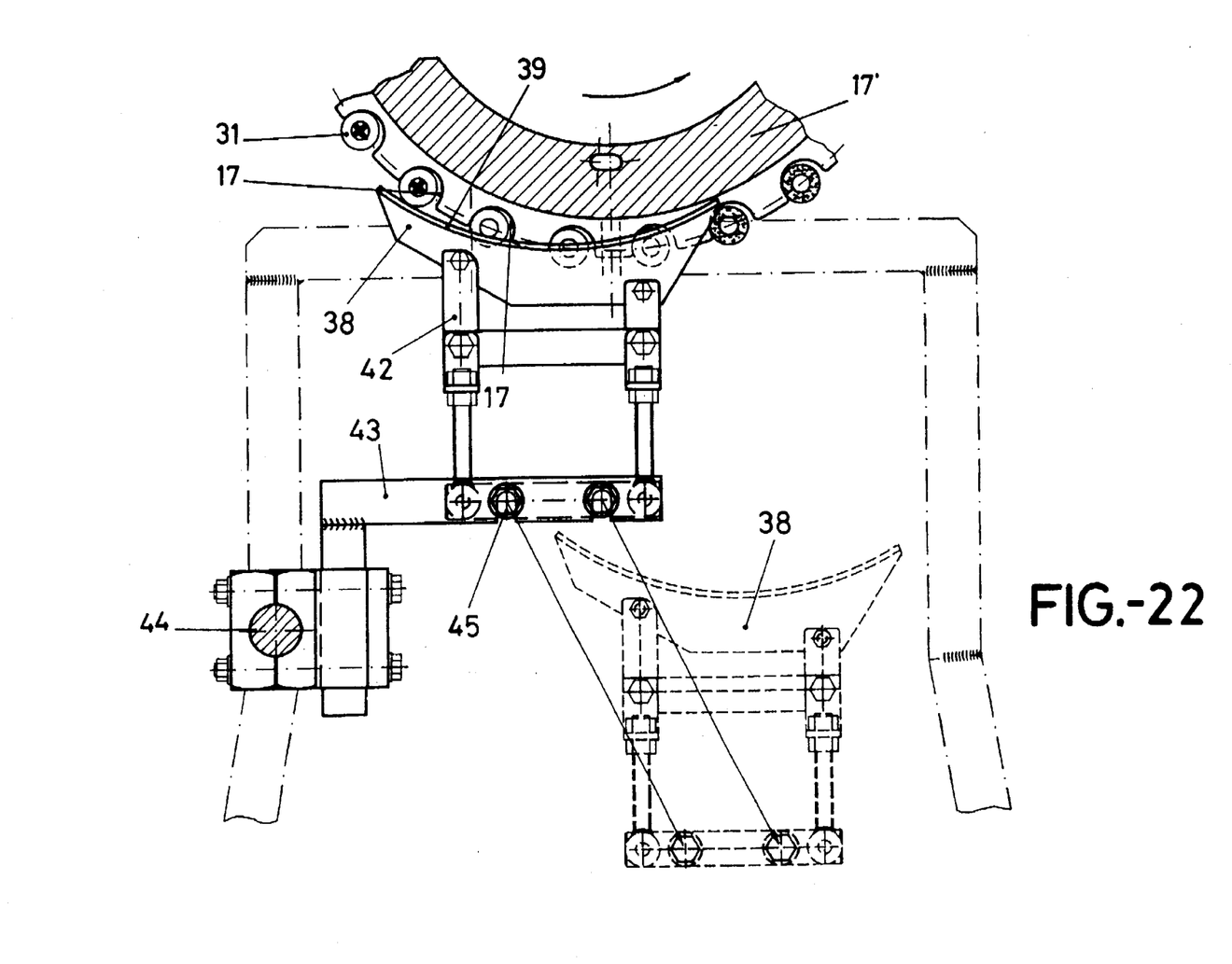
FIG. 22 Finally shows the same assembly of the previous figure in an embodiment which differs in how the cutting mechanism is mounted upon the respective support.

This possibility is also feasible with the solution shown in FIG. 22, where the support (42) can be quite simply uncoupled from the arm (43), being separated therefrom, by means of screws (45).

A swivel-mounted support as in FIG. 21 or a detachable support as in FIG. 22 for the set of fixed blades (38) can naturally also be used for the mobile set of blades shown in the practical embodiment of FIGS. 1 to 13.

We claim:
1. An olive stoning machine comprising:
conveyor means for conveying olives;
a main drum for rotation about an an axis and having a perimeter;
cups respectively on a plurality of stoning axes (18) on the main drum at the perimeter for respectively receiving the olives tangentially form the conveyor mean;
a nozzle (11) for cutting tips of the olives on the cups;
a stoning punch (13) and for stoning the tip-cut olives on the cups;
an ejector (10) for eliminating the tips of the stoned olives;
slicing cradles (17) respectively on the stoning axes (18) at a distance from the cups (14)
and spears (13') on an outer surface of the punch for retaining the olives on the punch while the punch retracts after stoning olives toward the slicing cradle (17).
2. The olive stoning machine as in claim 1, and further comprising;
a cradle-bearing discs or plates (17') respectively associated with the slicing cradles for turning in synchrony with the main drum; and
a cutting mechanism at the perimeter of the main drum and having a plurality of cutting blades (23, 38) for acting with each of the cradles (17),
wherein the slicing cradles have slots (17") for receiving the cutting blades (23, 38), whereby to ensure that the stoned olives (31) are fully cut.
3. The olive stoning machine as in claim 2, wherein the cutting blades comprise mobile cutting discs (23) and further comprising a drive element (19) for driving the discs.
4. The olive stoning machine as in claim 2, and further comprising a support (42), wherein the cutting blades (38) are fixed to a the support (42),the cutting blades each having a cutting-edge (39) that is arcuate and concave in shape with a curvature that is slightly off-center with respect to the axis of the main drum axis (1), the cutting-edge (32) progressively approaching a bottom of one of the slots (17") in a direction of the rotation of the main drum for reaching the bottom of the one of the slots (17').
5. The olive stoning machine as in claim 2, and further comprising an ejection comb (37) having teeth (37') in spaces between the cutting blades (23, 38) for causing olive slices (31') to be ejected and released.
6. The olive stoning machine as in claim 4, wherein the support (42) is associated to an arm (43) for swivelling about another axis (44) and allowing the cutting blades to move away from the main drum toward an inactive position, whereby to obtain operation exclusively as a stoner.
7. The olive stoning machine as in claim 4, wherein the cutting blades can be removed, whereby to obtain operation exclusively as a stoner.

* * * * *